9303X
2 Sheets—Sheet 1.
B. BARKER.
BAND SAW MILL.
Patented Jan. 6, 1836.
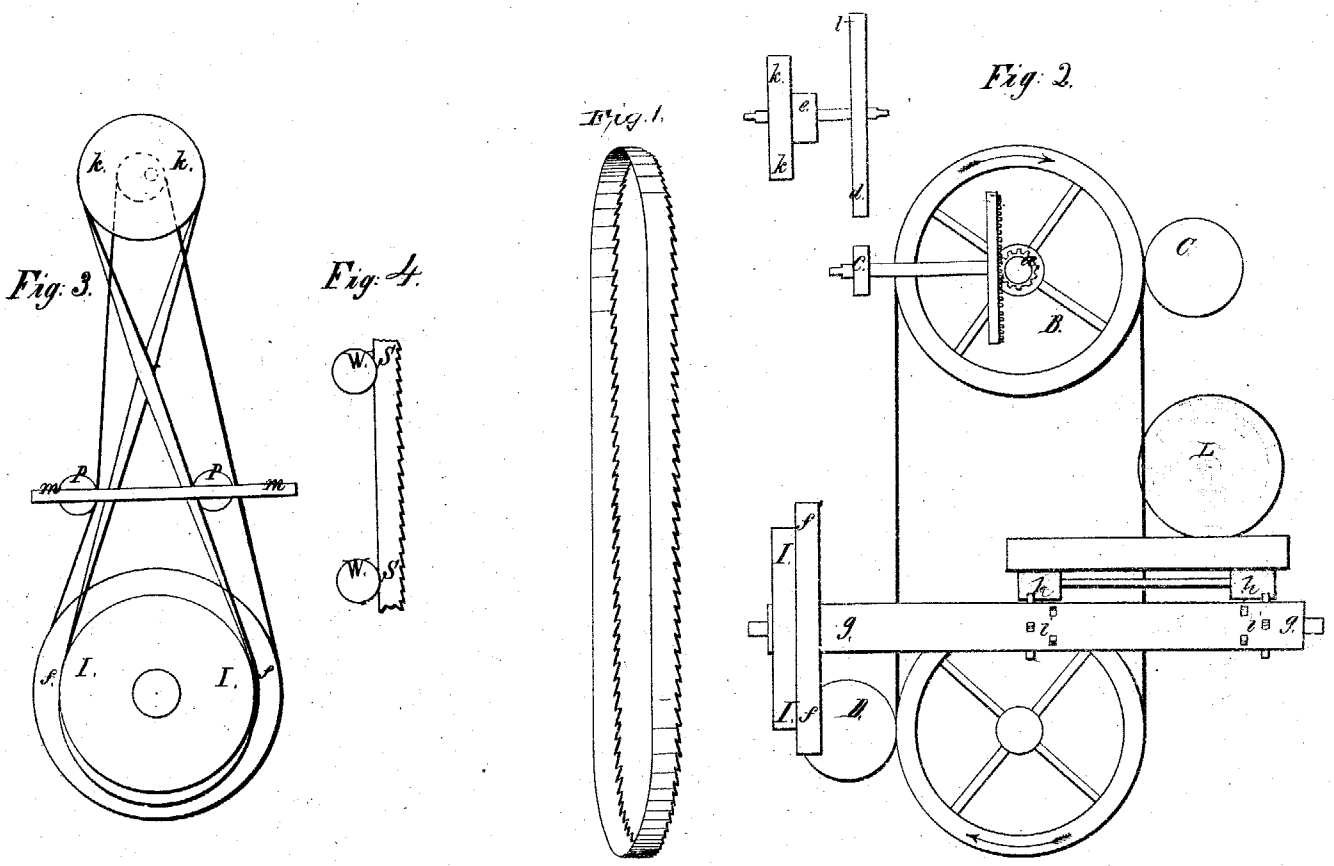

9303X
2 Sheets—Sheet 2.
B. BARKER.
BAND SAW MILL.
Patented Jan. 6, 1836.
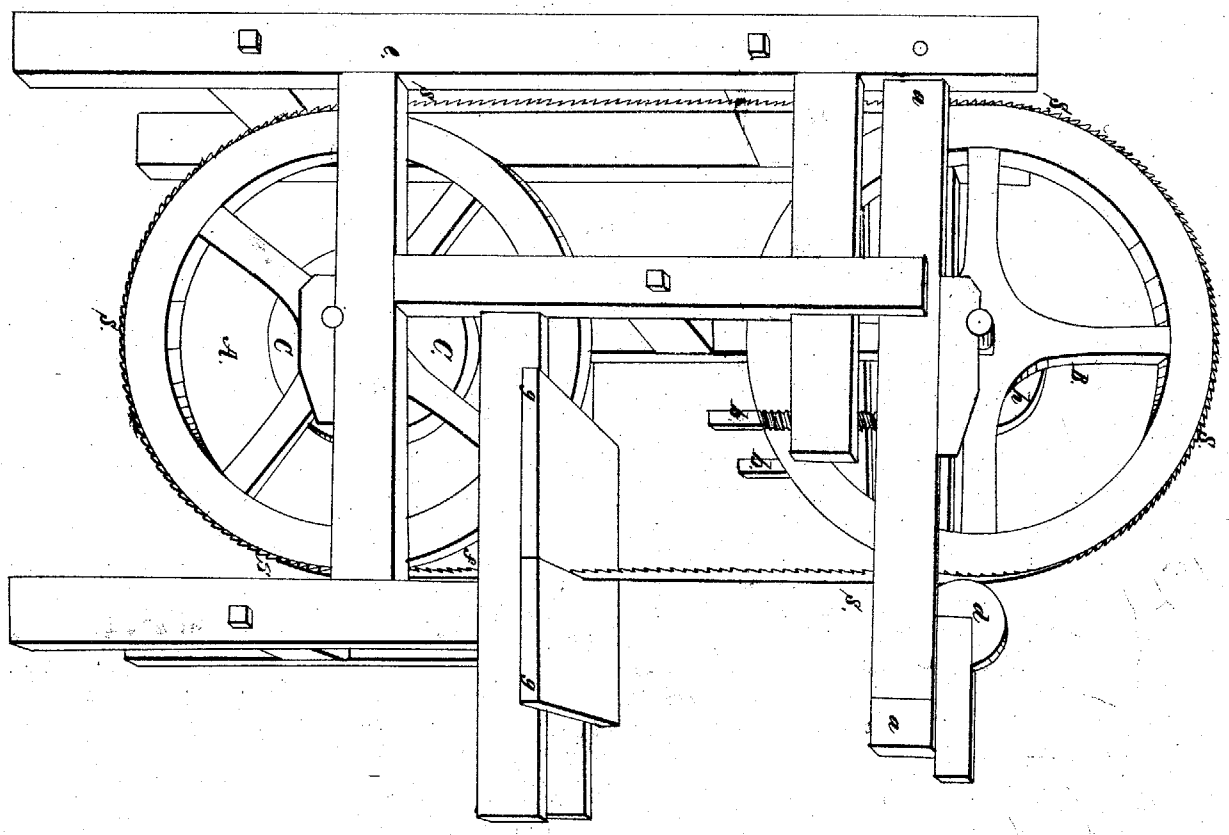

Jan 6. 1836

Benjamin Barker, of Ellsworth, Maine. 9303X
Letters Patent.

The schedule referred to in these Letters Patent, and making part of the same, containing a description in the words of the said Benjamin Barker, himself of his improvement in the elastic Belt saw for cutting all kinds of timber —

To all to whom these presents shall come: Be it known that I Benjamin Barker of Ellsworth, in the County of Hancock, and State of Maine, have invented a new and useful improvement in the sawing of Boards, Timber Shingles laths &c. by means of an elastic revolving Belt saw, and that the following is a full and exact description thereof — My invention consists of a saw of about thirty four feet long, nine inches wide and one twelfth of an inch thick having its ends joined together so as to form a perfect hoop or belt and being made very elastic is to be passed round two wheels or cilinders about five feet in diameter (one directly above the other) by which it is drawn out into an oblong shape as may be seen by the annexed drawing where Fig. 1 is a perspective view of the saw. In fig. 2 the line S.S.S.S.S.S. shows a longitudinal section of the saw, circumscribing the two wheels A & B. The saw is strained or drawn tense by raising the wheel B. while the wheel A. remains stationary which is to be done by means of screws attached to the bridge trees on which the wheel B. hangs. The motive power is attached to the shaft of the wheel & moving it that way indicated by the arrow on its rim. The saw by its attention to this wheel is caused to revolve with it passing alternately under this and over the wheel B which is by this means caused to revolve also. The two wheels C & D. are placed against the saw at the points where it is leaving the wheels A & B. to prevent the centrifugal force which it has acquired in passing round them from bending it out of its proper course; similar wheels may be placed at the opposite points for a similar purpose if necessary. L. shows the position of log when the saw begins to operate upon it. H.H. is the head block, on which it rests. The manner in which the log is moved towards the saw is as follows on the shaft of the wheel B.

is fixed a pinion a which meshes into and turns a cog wheel b.b. on the Shaft of this is a pulley c from which a band passes round and turns a wheel d.d: on the shaft of this is another pulley e having a band passing from it round and giving motion to the wheel ff. which is fixed to the Shaft J.J. This band called the feeding band is to be kept tense by means of a pulley hung in a moveable frame and bearing against one of its parts and may be slacked at any time by moving the pulley from it to stop the motion of the wheel ff. at i.i. in the Shaft J.J. spurs are set which mesh into the mortises in the under side of the carriage h.h. and move it forward bringing with it the head block and log. When the saw has passed quite through the log, the feeding band is to be slackened to stop the progress of the log, the carriage is then to be moved back again by means of another band called the gig band which is crossed passing round the two wheels k.k and l.l.. The operation of these two bands will be more clearly seen in Fig. O. where by moving the frame m.m. forwards the feeding band is tightened by the pulley P. and by means of a spring catch is kept in this position till the saw has passed through the log the catch is then loosed by means of a trip which is operated upon by a nog in the side of the carriage.

The gig band is tightened by the pulley q by moving the frame back which by means of another catch is kept back till the log has passed quite back when it is loosed by another trip operated upon by the head block. Fig. 4. shows the manner in which the saw is prevented from being pushed off the wheels by the resistance of the log against its edge ss is a section of the saw. W.W. small iron wheels having a groove round the edge of each to receive the back of the saw against which they are to be placed above and below the log fig. D. The above described saw may be used as well for cutting off as for splitting -

What I claim as my own invention and not previously known in the above described machine is the elastic revolving belt saw, and the manner of using the same. I do not therefore claim as my invention any of the other several parts of said machine nor their particular combinations -

Witnesses.

Geo. Jarvis, Charles Jarvis -,

Benjn Barker